United States Patent [19]

Gillis

[11] Patent Number: 4,962,696
[45] Date of Patent: Oct. 16, 1990

[54] GRILL TOP SMOKER

[76] Inventor: Harold A. Gillis, Rte. 2, Box 23, Claremore, Okla. 74017

[21] Appl. No.: 457,274

[22] Filed: Dec. 27, 1989

[51] Int. Cl.⁵ .......................................... A47J 37/04
[52] U.S. Cl. ........................................ 99/340; 99/352; 99/417; 99/448; 99/482; 126/9 R; 126/25 R
[58] Field of Search ............. 99/482, 483, 481, 340, 99/352, 417, 448–450, 467; 126/25 R, 25 A, 25 B, 9 R, 9 B

[56] References Cited

U.S. PATENT DOCUMENTS

| | | | |
|---|---|---|---|
| 3,776,127 | 12/1973 | Muse | 99/482 |
| 4,020,322 | 4/1977 | Muse | 99/448 |
| 4,175,485 | 11/1979 | Wojahn | 99/482 |
| 4,300,444 | 11/1981 | Muse | 99/448 |
| 4,334,462 | 6/1982 | Hefling | 126/25 R |
| 4,467,709 | 8/1984 | Anstedt | 126/9 R |
| 4,495,860 | 1/1985 | Hitch et al. | 99/340 |
| 4,512,249 | 4/1985 | Mentzel | 99/352 |
| 4,554,864 | 11/1985 | Smith et al. | 99/417 |
| 4,587,947 | 5/1986 | Tomita | 126/9 R |

Primary Examiner—Timothy F. Simone
Attorney, Agent, or Firm—Head and Johnson

[57] ABSTRACT

A smoking for use with a patio grill of the type having an open horizontal cooking surface and means therebelow for providing heat such as by burning charcoal, an electric heating element or a gas fire, the smoker being formed of a bottom section having an open horizontal bottom with a peripheral edge dimensioned to rest upon the open horizontal cooking surface of the patio grill, the bottom section having closed sides and end walls and an upper, open horizontal top, a horizontal cooking grill supported by the bottom section adjacent the open top, and the smoker having a removable top section with an open horizontal bottom with peripheral edge dimensioned to rest upon and closely engage the bottom section top peripheral edge and having closed side walls and end walls and dimensioned to provide a closed space to encompass food to be smoked resting on the horizontal cooking grill.

4 Claims, 2 Drawing Sheets

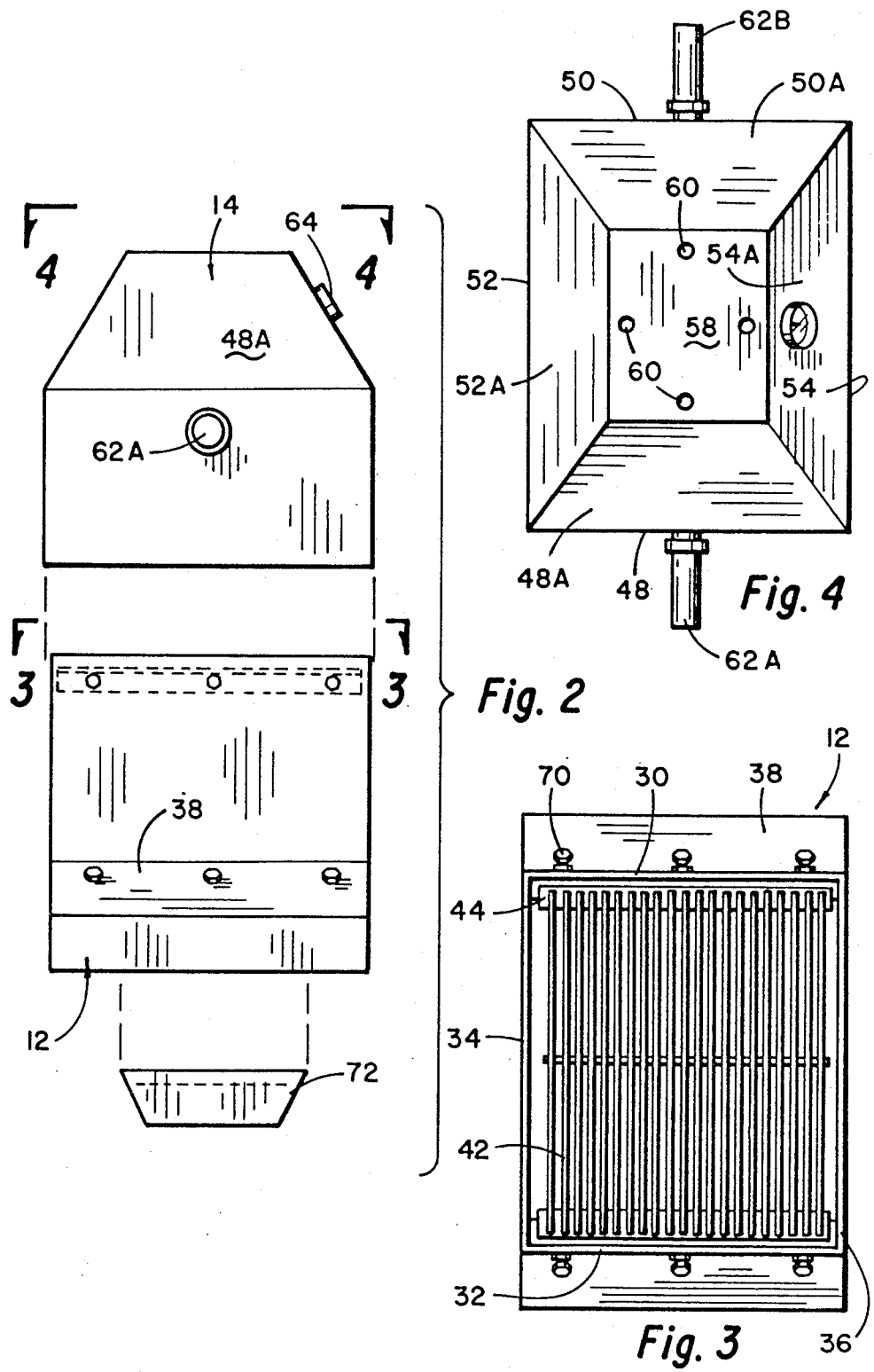

GRILL TOP SMOKER

SUMMARY OF THE INVENTION

A pastime enjoyed by many Americans and others around the world is that of smoking food, such as turkey, chicken, ham, fish etc. The usual smoker is a device having a provision for generating heat, such as an area for containing charcoal or an electric heating element or a gas fire. Since food is typically smike over a long period of time and usually in large quantities, the typical smoker is only occasionally used by the owner. In contrast, most families who own and enjoy smokers also have a cooking grill, commonly referred to as a patio grill. Such patio grills are used frequently for preparing food for immediate consumption, such as hamburgers, steaks, fish, chicken and so forth. Compared to smoking food in a smoker, food cooked on a patio grill is usually done in preparation for a meal and is a short-term process. Thus, many home owners and apartment dwellers have two separate pieces of outdoor cooking equipment, that is, a patio grill and a smoker. The present disclosure is directed to a type of smoker for use in conjunction with a paito grill to thereby avoid duplication of equipment normally employed by many home owners and apartment dwellers. The smoker of this disclosure is used in conjunction with the patio grill in a manner so that the patio grill furnishes a source of heat for the smoker as well as a support of the smoker at a comfortable height for the user.

The smoker of this disclosure has, as above indicated, been created for use with a patio grill of the type having an open horizontal cooking surface and means below the cooking surface for providing heat, such as by burning charcoal, an electric heating element or a gas fire.

The smoker is formed of a bottom section having an open horizontal bottom with a peripheral edge dimensioned to rest upon the open horizontal cooking surface of the patio grill. The bottom section has closed side walls and end walls and an open horizontal top with a peripheral edge.

A horizontal cooking grill is supported by the bottom section adjacent the open top and provides means for supporting food to be smoked thereon.

A top section has an open horizontal bottom with a peripheral edge to rest upon and closely engage the bottom section top peripheral edge. The top section has closed side walls and end walls and is dimensioned to provide a closed space to encompass food to be smoked resting on the horizontal cooking grill. The top section has a closed top with openings therein for a discharge of smoke. The top section is easily removable from the bottom section to expose food on the cooking grill.

In an alternate embodiment, the bottom section may be provided with a second cooking grill spaced from and below the first mentioned cooking grill. The second cooking grill is thereby spaced above the bottom opening and provides a second grill for positioning food thereon for smoking.

In using the smoker of this disclosure, a preferred arrangement is to place a container of water on the patio grill prior to positioning the smoker bottom section on the grill so that water is evaporated by heat supplied by the patio grill to maintain high humidity within the interior of the smoker.

The top section preferably has handles extending from the exterior of the opposed end walls to facilitate easy removal of the top section from the bottom section. In addition, the top section may also include a temperature indicator. The openings provided in the top section for the discharge of smoke therethrough may be provided with variable closures so the amount of discharge of smoke through the top section can be controlled.

For reference to other types of smoking devices see the following previously issued U.S. Pat. Nos.: 4,512,249; 3,776,127; 2,833,201; 495,860; 1,176,720; 4,175,485; 3,049,071; 2,221,098; 2,789,877; 2,786,463; 3,851,639; 4,334,462; 3,299,800; 2,842,043; 4,721,037; 2,645,993; 4,094,295; 4,467,709; 3,841,211; 4,672,944.

The disclosure will be better understood by reference to the following description and claims, taken in conjunction with the attached drawings.

DESCRIPTION OF THE DRAWINGS

FIG. 2 is an elevational exploded view of the smoker of FIG. 1 showing the bottom section, the top section, and a pan as used with the smoker.

FIG. 3 is a top view of the bottom section showing the cooking grill as taken along the line 3—3 of FIG. 2.

FIG. 4 is a top view of the smoker as taken along the long 4—4 of FIG. 2, only the top section being shown in FIG. 4.

DESCRIPTION OF THE PREFERRED EMBODIMENT

Figure 1:
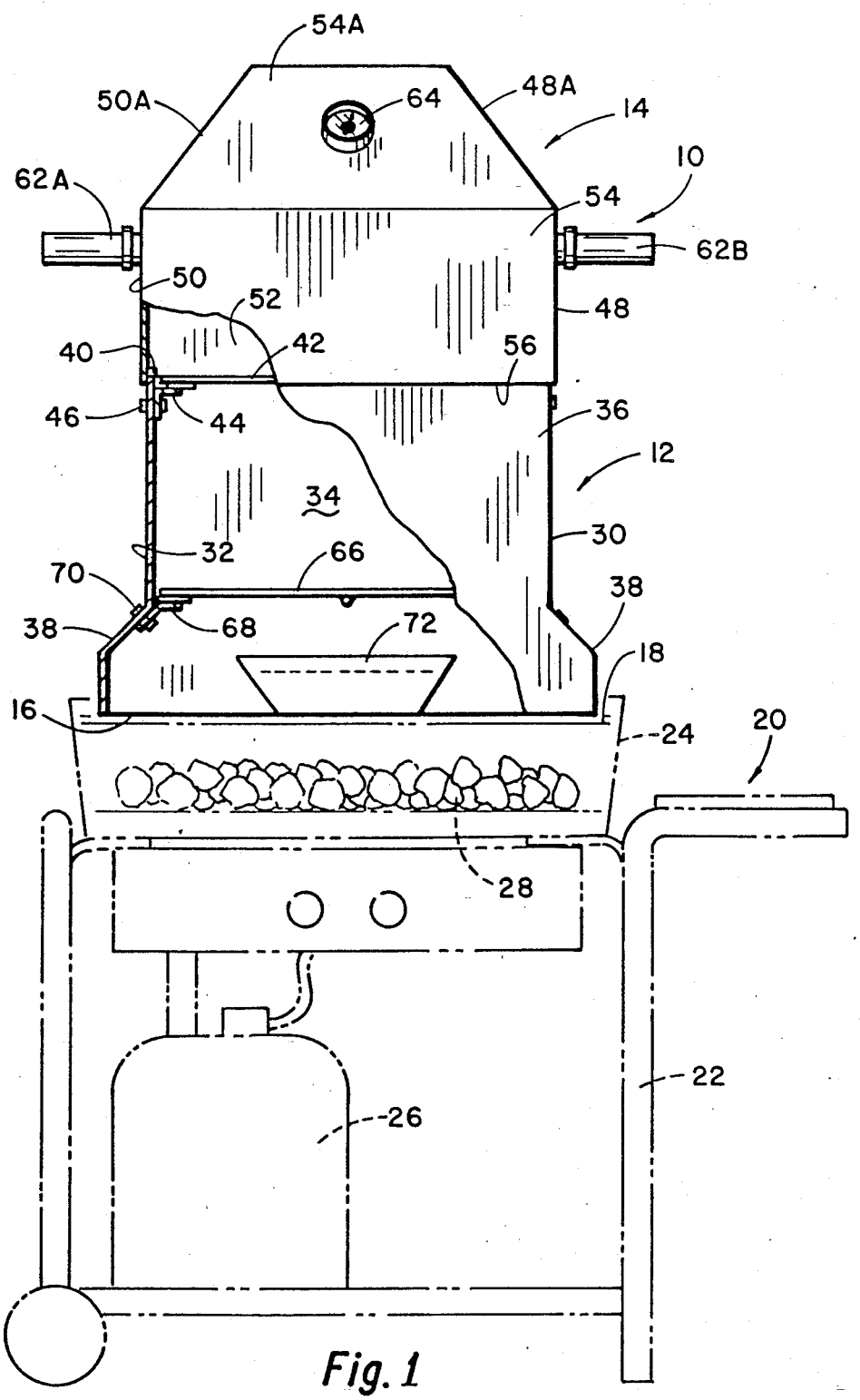
FIG. 1 is an elevational view, shown partially cut away, of a smoker embodying the principles of this disclosure, the smoker being shown in solid line. The smoker is shown in conjunction with the typical patio grill, with such grill being shown in dotted outline since it is not a part of the disclosure but is representative of the type of patio grill on which the smoker is used.

Referring to FIG. 1, the smoker of this invention is generally indicated by the numeral 10. The smoker includes a bottom section 12 and a top section 14. The bottom section has an open horizontal bottom 16 with a peripheral edge which is dimensioned to rest upon the grill surface 18 of a typical patio grill, generally indicated by the number 20. The patio grill 20 is not a part of this disclosure but is the type of commonly existing patio grills with which the smoker of this invention is employed. The patio grill has a framework 22 that supports of fire box 24, with a means of providing a fire, such as a source of gas fuel 26. Within the fire box 24 are briquettes 28. When the patio grill 20 is of the type illustrated having a gas source 26, the briquettes 28 are usually of ceramic or non-combustible material. The patio grill 20 could be the type without a supplemental fuel source in which the briquettes 28 may be of charcoal which, upon igniting, burn to produce heat. Another type of patio grill (not illustrated) includes the use of an electric heating element for producing heat. Usually when such electric heating elements are employed, ceramic briquettes 28 are used in the same manner as used for a gas fired grill.

The grill 20 is of the type frequently found on the patios and in the yards of home owners and apartment dwellers in the United States and other countries. Such patio grills are frequently used for cooking hamburgers, steaks, chicken, fish, etc. that are prepared on the open grill surface 18. Patio grill 20, while adapted for easy use to prepare food for immediate consumption, is not adaptable for use to smoke food, which is usually accomplished over a relatively long period of time. The smoker 10 is particularly adaptable for use with the commonly known patio grill 20.

The smoker bottom section 12 includes side walls 30 and 32, and end walls 34 and 36. In the preferred arrangement, the side walls 30 and 32 flare outwardly at 38 adjacent the bottom peripheral edge 16 so as to substantially cover the entire rectangular cross-sectional area of the patio grill surface 18.

The bottom section 12 has an open horizontal top peripheral edge 40. Supported by the bottom section adjacent the open top 40 is a cooking grill 42. The cooking grill 42 can be supported, such as on angle pieces 44 attached to the side walls 30 and 32, by means of bolts 46. Thus, the bottom section 12 provides a closed chimney-like structure with a cooking grill 42 positioned at a distance spaced above the patio grill surface 18. Food to be smoked is placed on the cooking grill 42.

The top section 14 includes side walls 48 and 50, and end walls 52 and 54. The top section has an open horizontal bottom peripheral edge 56 which rests upon and closely conforms to the bottom section, top peripheral edge 40.

The top section 14 is dimensioned to encompass food resting upon the cooking grill 42. The top section 14 has a top which, in the preferred and illustrated arrangement, is formed of tapered side walls 52A and 54A, and tapered end walls 48A and 50A (See FIG. 4.) These tapered walls slope inwardly and upwardly in a truncated manner and are closed by a horizontal flat top surface 58. This structure provides room to receive a relatively large amount of food to be smoked, such as a large turkey, while confining the area to concentrate the heat and smoke on the food.

Openings 60 are formed in the top section top surface 58 to permit smoke to escape therethrough. While not shown, the openings 60 may be provided with adjustable closures so that the user can adjust the amount of smoke escaping.

Handles 62A and 62B are affixed to and extend from the outer surface of the upper section end walls 48 and 50 to provide a easy means for removing the top section 14. When the top section is removed, any food being smoked resting on grill 42 is fully exposed so that the food can be turned, basted or inspected by the user. The top section 14 may also be supplied with a temperature indicator 64.

A second cooking grill 66 may be utilized with the smoker. The second grill is supported within the bottom section 12 and spaced above the bottom section lower bottom edge 16. This can be accomplished by the use of brackets 68 held in place by bolts 70. The second or supplemental cooking grill 66 can be used when all of the food to be smoked can not be placed on the first cooking grill 42. To gain access to food on the supplemental cooking grill 66, the top section 14 and the first cooking grill 42 are removed. The supplemental cooking grill 66 will normally be employed only for smoking food which does not have to be carefully attended.

When smoking food, it is helpful to maintain humidity so that the food will not be unduly dried. To accomplish this, a pan 72 can be positioned on the patio grill surface 18 and filled with water prior to the placement of food onto grills 42 and 60.

The smoker of this disclosure can be economically manufactured since it does not require a fire box or other means for producing and controlling heat for use in smoking. The smoker is convenient to use in conjunction with the patio grill 20 to thereby save the homeowner or apartment dweller the additional expense connected with providing a smoker having its own fire box. In addition, by the use of the smoker in conjunction with an existing patio grill, a structure is provided for supporting the smoker at a comfortable elevation, such as that provided by the framework 22 of the patio grill.

The claims and the specification described the invention presented and the terms that are employed in the claims draw their meaning from the use of such terms in the specification. The same terms employed in the prior art may be broader in meaning than specifically employed herein. Whenever there is a question between the broader defination of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved smoker for use with a patio grill of the type having an open horizontal cooking surface and means below the cooking surface for producing heat such as by burning charcoal, an electric heating element or a gas fire, the smoker comprising:

a bottom section having an open horizontal bottom with a peripheral edge dimensioned to rest upon the open horizontal cooking surface of a patio grill and having opposed sides and end walls and an open horizontal top with a peripheral edge, said side walls at least in part flaring upwardly and inwardly whereby said open horizontal top is of less cross-sectional area than said open horizontal bottom;

a horizontal cooking grill supported on said bottom section adjacent said open top; and a top section having an open horizontal bottom with a peripheral edge to rest upon and closely engage said bottom section top peripheral edge, the top section having closed side walls and end walls and dimensioned to provide a closed space to encompass food to be smoked resting on said horizontal cooking grill, and having a closed top, said top sections side walls and end walls at least in part tapering inwardly and upwardly whereby said closed top is of less horizontal cross-sectional area than said top section horizontal bottom, the top section having smoke discharge openings therein, the smoker being thereby of generally pyramidal shape providing stability as the smoker rests upon the open horizontal cooking surface of a patio grill, the top section being easily removable from said bottom section to expose food on said cooking grill.

2. A smoker according to claim 1 wherein said bottom section has a second cooking grill therein positioned below and spaced from said first mentioned cooking grill and above said bottom peripheral edge whereby food may be simultaneously smoked in said bottom section and said top section.

3. A smoker according to claim 1 including a water containing pan supportable within said bottom section and on said patio grill cooking surface.

4. A smoker according to claim 1 including handle means extending from said top section end wall whereby said top section can be easily removed from said bottom section.

* * * * *